United States Patent
Morikawa et al.

(10) Patent No.: US 8,873,805 B2
(45) Date of Patent: Oct. 28, 2014

(54) TRAJECTORY INTERPOLATION APPARATUS AND METHOD

(75) Inventors: Hiroaki Morikawa, Kawasaki (JP);
Tatsuya Asai, Kawasaki (JP);
Shinichiro Tago, Shinagawa (JP);
Hiroya Inakoshi, Tama (JP); Nobuhiro Yugami, Minato (JP); Seishi Okamoto, Hachioji (JP)

(73) Assignee: Fujitsu Limited, Kawasaki (JP)

( * ) Notice: Subject to any disclaimer, the term of this patent is extended or adjusted under 35 U.S.C. 154(b) by 283 days.

(21) Appl. No.: 13/590,277

(22) Filed: Aug. 21, 2012

(65) Prior Publication Data
US 2013/0089234 A1      Apr. 11, 2013

(30) Foreign Application Priority Data
Oct. 11, 2011    (JP) ................ 2011-224324

(51) Int. Cl.
G06K 9/00          (2006.01)
G08G 1/00          (2006.01)
G08G 1/01          (2006.01)

(52) U.S. Cl.
CPC .. *H06K 9/62* (2013.01); *G08G 1/00* (2013.01); *G08G 1/0112* (2013.01); *G01V 21/00* (2013.01)
USPC ............................. 382/103; 382/104; 382/107

(58) Field of Classification Search
USPC .......................................... 382/103, 104, 107
See application file for complete search history.

(56) References Cited

U.S. PATENT DOCUMENTS

| | | | |
|---|---|---|---|
| 5,425,109 A | 6/1995 | Saga et al. | |
| 6,311,129 B1 * | 10/2001 | Lin | ................ 701/472 |
| 6,539,288 B2 * | 3/2003 | Ishida et al. | ................ 701/1 |
| 2010/0076640 A1 * | 3/2010 | Maekawa et al. | ................ 701/26 |
| 2013/0131978 A1 * | 5/2013 | Han et al. | ................ 701/436 |

FOREIGN PATENT DOCUMENTS

| | | |
|---|---|---|
| JP | 06-028418 | 2/1994 |
| JP | 06-162199 | 6/1994 |
| JP | 2010-073080 | 4/2010 |

* cited by examiner

*Primary Examiner* — Stephen R Koziol
*Assistant Examiner* — Shaghayegh Azima
(74) *Attorney, Agent, or Firm* — Fujitsu Patent Center

(57) ABSTRACT

A trajectory interpolation apparatus is disclosed. The first storage part stores first time and first location information of a movable body at the first time. The second storage stores second time and second location information of the movable body at the second time. The calculation part calculates a first moving distance from the first time and a second moving distance from the second time based on a relationship between the time and the speed stored in the second storage part, regarding third time between the first time and the second time. The determination part determines, as the interpolation point, one of intersection points for a circle in which the first location is set as its center and the first moving distance is set as its radius, and another circle in which the second location is set as its center and the second moving distance is set as its radius.

12 Claims, 19 Drawing Sheets

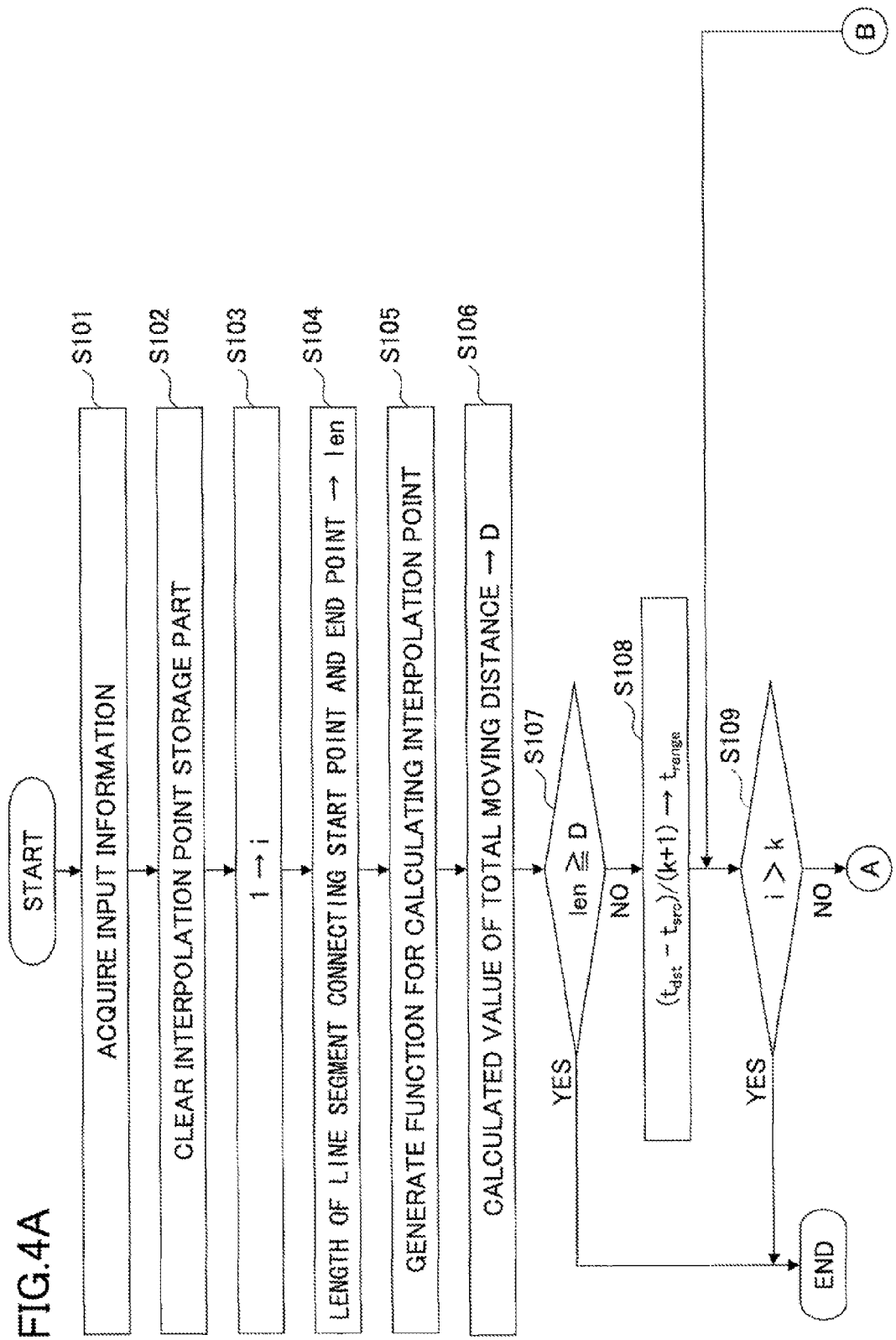

FIG.5

| VEHICLE ID | START POINT INFORMATION | END POINT INFORMATION |
|---|---|---|
| 0001 | (090000,12,35.786,137.56) | (090005,14,36.35,138.43) |
| 0002 | (090001,25,35.35,137.42) | (090004,28,36.84,138.24) |
| 00003 | (090003,18,35.24,136.34) | (090006,13,35.36,137.82) |
| ... | ... | ... |

FIG.6

| TIME | SPEED |
|---|---|
| $t_1(t_{src})$ | $v_1$ |
| $t_2$ | $v_2$ |
| ⋮ | ⋮ |
| $t_m(t_{dst})$ | $v_m$ |

22

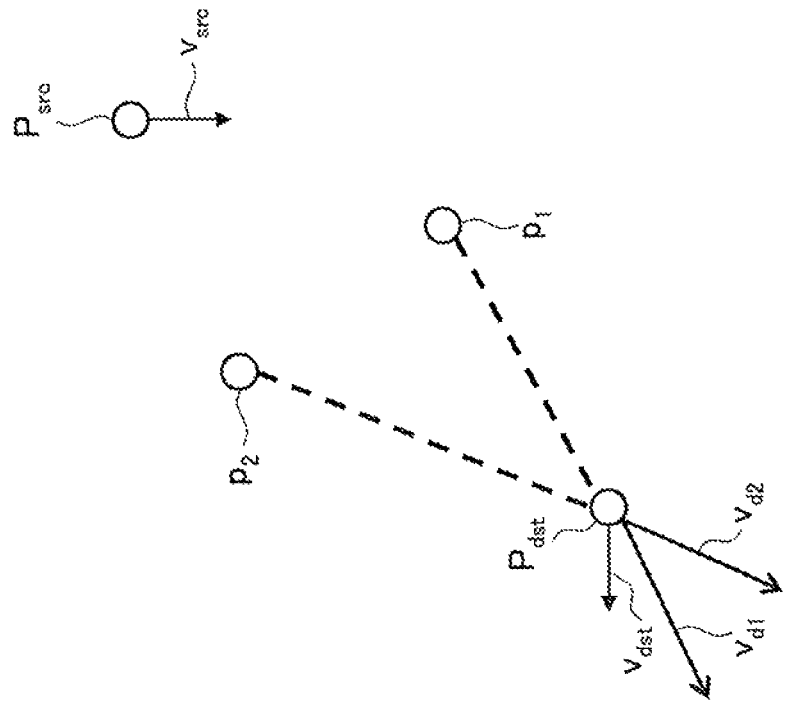
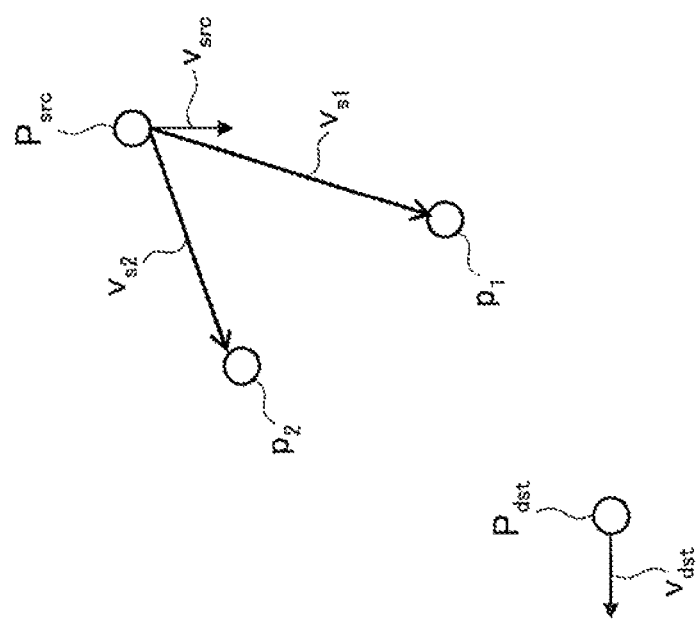
FIG.13A
FIG.13B

TRAJECTORY INTERPOLATION APPARATUS AND METHOD

CROSS-REFERENCE TO RELATED APPLICATIONS

This patent application is based upon and claims the benefit of priority of the prior Japanese Patent Application No. 2011-224324 filed on Oct. 11, 2011, the entire contents of which are incorporated herein by reference.

FIELD

The embodiment discussed herein is related to a trajectory interpolation apparatus, a trajectory interpolation method, and a computer-readable recording medium thereof.

BACKGROUND

A travelling locus of a vehicle mounting an on-vehicle unit which includes a Global Positioning System (GPS) is prehensible based on a set of position information such as latitude, longitude, and the like measured by the GPS.

However, an interval of an observation point of the position information by the GPS may not be sufficient with respect to desired precision of the travelling locus. Conventionally, interpolation points concerning the traveling locus are acquired by a spline interpolation method. In the spline interpolation method, when a set of points is given, a polynominal equation passing all points is acquired, and the interpolation points are obtained.

FIG. 1 is a diagram illustrating an example of interpolation points acquired by the spline interpolation method. In FIG. 1, a white dot indicates the observation point, and a black dot indicates an interpolation point. In the spline interpolation method, the polynominal equation acquired based on the set of observation points is calculated. Thus, the interpolation points are obtained on a spline curve line depicted by the polynominal equation.

Movement of the vehicle includes concepts of time and speed as well as a location. In the spline interpolation method, the time and the speed are abstracted. In a point in which the time and the speed are not considered, accuracy of the observation point acquired by the spline interpolation method may not be sufficient.

PATENT DOCUMENTS

Japanese Laid-open Patent Publication No. 2010-73080
Japanese Laid-open Patent Publication No. 06-28418
Japanese Laid-open Patent Publication No. 06-162199

SUMMARY

According to one aspect of the embodiment, there is provided a trajectory interpolation apparatus, including: a first storage part configured to store a first time and first location information indicating a first location of a movable body at the first time, and to store a second time and second location information indicating a second location of the movable body at the second time; a second storage part configured to store time and speed of the movable body at the time; and a calculation part configured to estimate the speed of the movable body between times which the second storage part stores, based on a relationship between the time and the speed which are stored in the second storage part, to specify a third time used to determine a point to interpolate for each of points based on information for specifying a count of the points which interpolate between the first location of the movable body at the first time and the second location of the movable body at the second time, and to calculate a first moving distance from the first time to the third time and a second moving distance from the third time used to acquire the first moving distance to the second time, based on estimated speed of the movable body; and a determination part configured to determine, as a point to interpolate, one of intersection points of a first circle and a second circle, the first circle in which a first location indicated by the first location information is set to be a first center, and the second circle in which a second location indicated by the second location information is set to be a second center.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 4A and FIG. 4B are a flowchart for explaining an example of a process procedure of a calculation process of the interpolation point;

FIG. 5 is a diagram illustrating a configuration example of an input information storage part;

FIG. 6 is a diagram illustrating a configuration example of a time/speed storage part;

FIG. 13A and FIG. 13B are diagrams illustrating examples of a determination method in which one of two intersection points is determined as the interpolation point;

DESCRIPTION OF EMBODIMENTS

Figure 1:
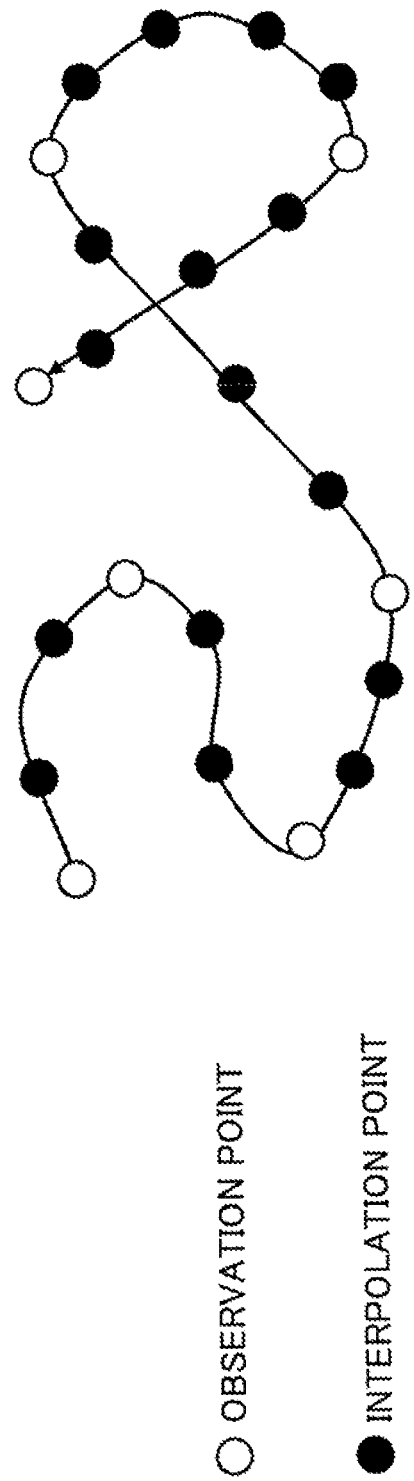
FIG. 1 is a diagram illustrating an example of an interpolation point acquired by a spline interpolation method.
Figure 2:
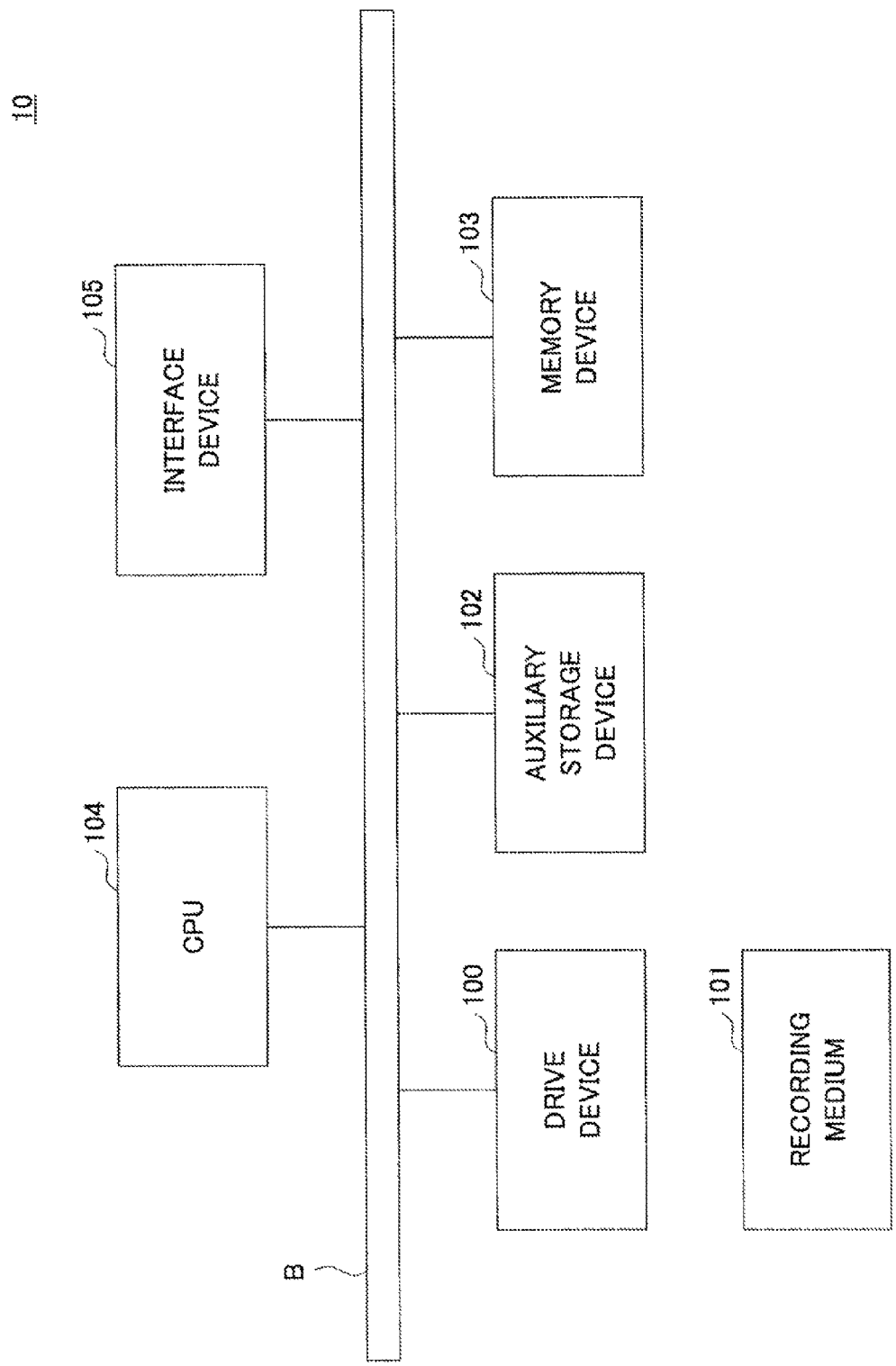
FIG. 2 is a diagram illustrating a hardware configuration example of a trajectory interpolation apparatus in an embodiment.

In the following, embodiments of the present invention will be described with reference to the accompanying drawings. FIG. 2 is a diagram illustrating a hardware configuration example of a trajectory interpolation apparatus in an embodiment. A trajectory interpolation apparatus 10 in FIG. 2 includes a drive device 100, an auxiliary storage device 102, a memory device 103, a CPU 104, and an interface device 105, which are mutually connected via a bus B.

A program realizing a process in the trajectory interpolation apparatus 10 is provided by a recording medium 101. The recording medium 101 may be formed by a non-transitory (or tangible) computer-readable recording medium. When the recording medium 101 recording the program is set to the drive device 100, the program is installed from the recording medium 101 to the auxiliary storage device 102 through the drive device 100. However, the installation of the program is not always performed from the recording medium 101, and may be conducted by downloading from another computer through a network. The auxiliary storage device 102 stores the installed program, and stores necessary files, data, and the like.

When the CPU 104 is instructed to execute the program, the program is read from the auxiliary storage device 102 and stored in the memory device 103. The CPU 104 executes a function pertaining to the trajectory interpolation apparatus 10 according to the program stored in the memory device 103. The interface device 105 is used as an interface to connect to the network.

As one example of the recording medium 101, a portable recording medium such as a Compact Disc Read-Only Memory (CD-ROM), a Digital Versatile Disk (DVD), a Universal Serial BUS (USB) memory or the like may be used. Also, as one example of the auxiliary storage device 102, a HDD (Hard Disk Drive), a flash memory, or the like may be used. Either recording medium 101 or the auxiliary storage device 102 corresponds to a computer-readable recording medium.

Figure 3:
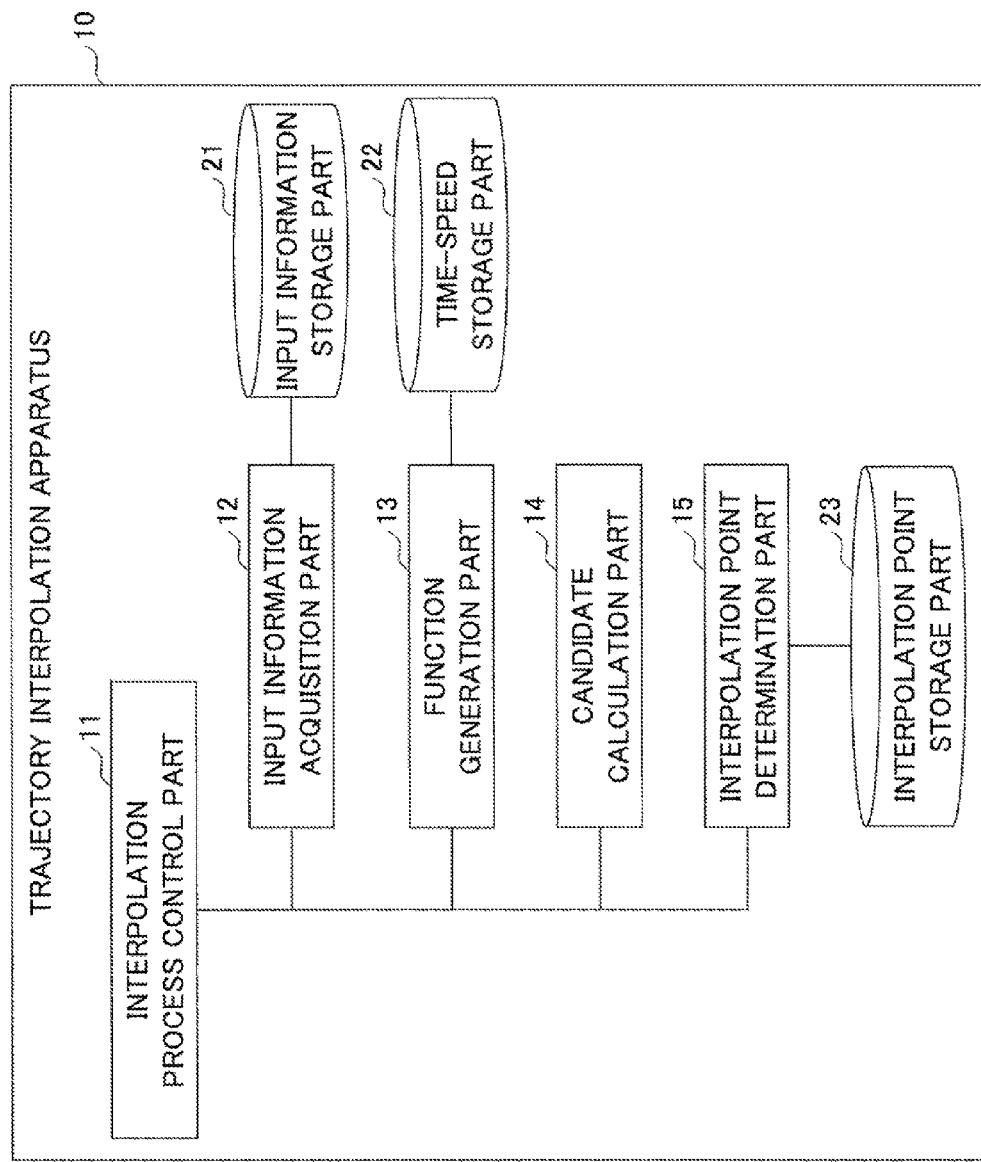
FIG. 3 is a diagram illustrating a functional configuration example of the trajectory interpolation apparatus in the embodiment.

FIG. 3 is a diagram illustrating a functional configuration example of the trajectory interpolation apparatus in the embodiment. In FIG. 3, the trajectory interpolation apparatus 10 includes an interpolation process control part 11, an input information acquisition part 12, a function generation part 13 for an interpolation calculation, a candidate calculation part 14 for an interpolation point, an interpolation point determination part 15, and the like. These parts 11 to 15 are realized by processes performed by the CPU 104 which executes the program installed into the trajectory interpolation apparatus 10. The trajectory interpolation apparatus 10 also includes an input information storage part 21, a time/speed storage part 22, an interpolation point storage part 23, and the like. These storage parts 21 to 23 may be realized by using storage devices which are connected to the auxiliary storage device 102, the memory device 103 or the trajectory interpolation apparatus 10 through the network.

The interpolation process control part 11 controls the entire process for acquiring the interpolation point. In the embodiment, an example will be described to acquire the interpolation point (a point to interpolate) concerning a moving path of a vehicle.

The input information acquisition part 12 acquires input information from the input information storage part 21. The input information includes location information pertaining to a start point, and location information pertaining to an end point of an interval which is desired to obtain the interpolation point, and the like.

The function generation part 13 generates an interpolation point calculation function by referring to time/speed storage part 22. The interpolation point calculation function is a function indicating a relationship between time and speed related to a movement of the vehicle, that is, a function indicating a change of the speed based on passage of time. The time/speed storage part 22 stores a discrete value of the speed of the vehicle by corresponding to time.

The candidate calculation part 14 calculates candidates of the interpolation points by using the interpolation point calculation function. The interpolation point determination part 15 determines or specifies the interpolation point from the candidates of the interpolation point. The interpolation point storage part 23 stores attribute information of the interpolation point.

Figure 4B:
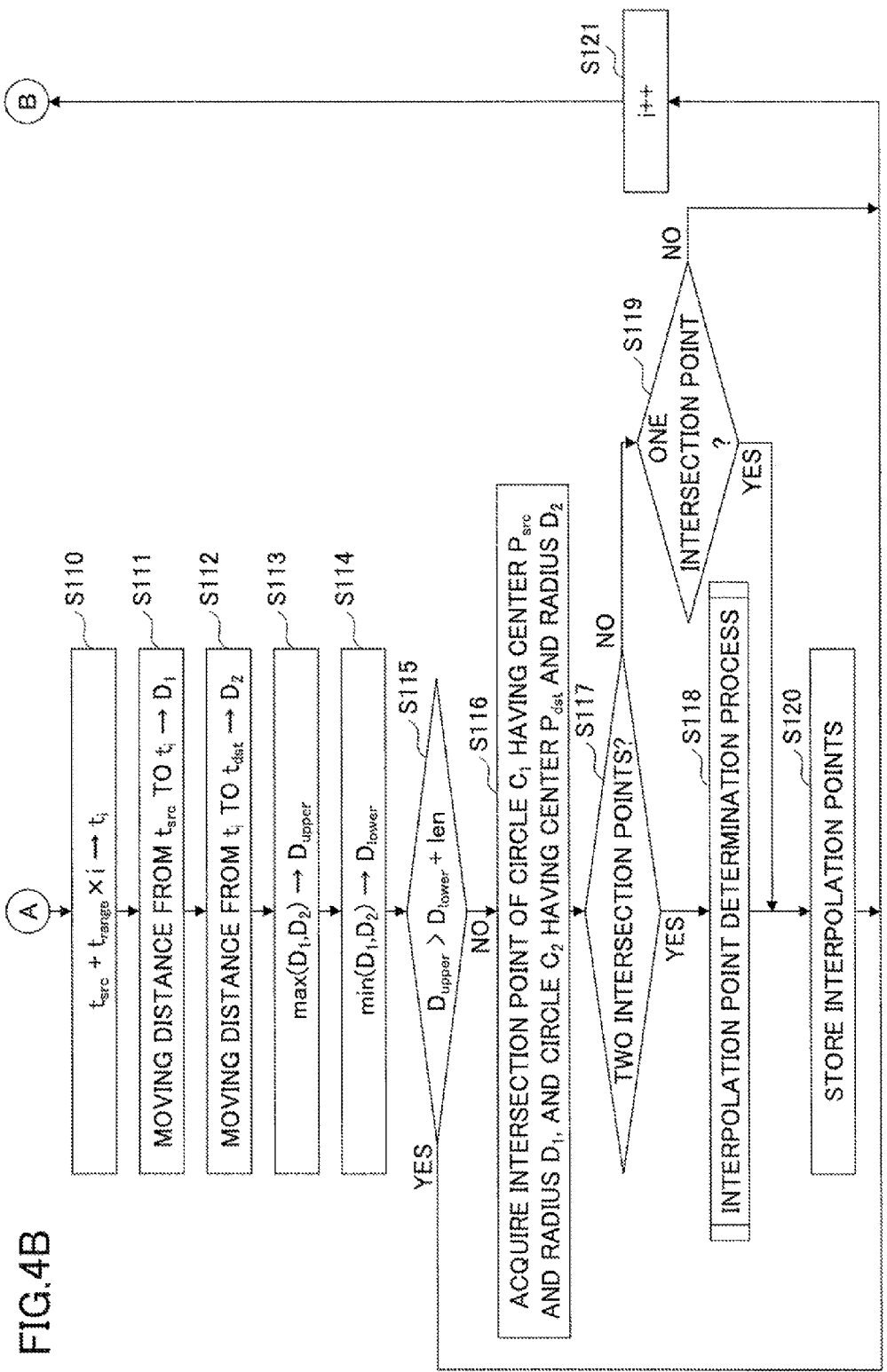

In the following, a process procedure performed by the trajectory interpolation apparatus 10 will be described. FIG. 4A and FIG. 4B are a flowchart for explaining an example of the process procedure of a calculation process of the interpolation point.

In step S101, the input information acquisition part 12 acquires the input information from the input information storage part 21.

FIG. 5 is a diagram illustrating a configuration example of the input information storage part 21. In FIG. 5, each of records in the input information storage part 21 includes a vehicle ID, start point information, end point information, and the like.

The vehicle ID indicates an identification of the vehicle. The start point information is regarded as information concerning a start location of the interval to acquire the interpolation point. The end point information is regarded as information concerning an end location of the interval to acquire the interpolation point. Hereinafter, the interval to acquire the interpolation point is called "interpolation interval". In addition, the start location of the interpolation interval is called "start point", and the end location of the interpolation interval is called "end point". Furthermore, time when the vehicle locates at the start point is called "start point time", and time when the vehicle locates at the end point is called "end point time".

In FIG. 5, the start point information and the end point information are indicated in a format of (time, moving direction, latitude, longitude). The time indicates the start time or the end time of the vehicle concerning the vehicle ID. The moving direction is regarded as a direction of the vehicle at the start point or the end point. The moving direction may be given in 0 to 360 degrees in clockwise. The moving direction may be represented by another format. The latitude and the longitude indicate a location of the start point or the end point. The latitude and the longitude may be an example of the location information.

Information stored in the input information storage part 21 may be regarded as information recorded by a Global Positioning System (GPS) function of an on-board device mounted in the vehicle. The moving direction may be measured by an electronic compass mounted in the on-board device, or may be specified based on a direction of a vector connecting a measured location immediately before or after the start point or the end point to the start point or the end point.

The input information storage part 21 may store multiple sets of the input information related to the same vehicle. That is, a track record on the time, the moving direction, the latitude, and the longitude which are measured by the on-board device of the same vehicle.

In step S101, one record is acquired from the input information storage part 21. A target record to acquire may be indicated by a user. By receiving indications of the vehicle ID and the time, the target record may be specified. In the following, in a case of simply indicating the input information, the start point information and the end point information recorded in the acquired record correspond to the input information. The input information may not be stored beforehand in the input information storage part 21, and may be input by the user in step S101. In this case, the memory device 103 stores the input information being input, and corresponds to the input information storage part 21.

After that, the interpolation process control part 11 clears the interpolation point storage part 23 (step S102). That is, information, which is stored in the interpolation point storage part 23 at a previous execution of the process in FIG. 4A and FIG. 4B, is deleted. Then, the interpolation process control part 11 initializes a value of a variable i to 1 (step S103). The variable i is used as a counter of a loop process which will be described later.

After that, the interpolation process control part 11 substitutes a value of a length of a line segment, which connects the latitude and longitude of the start point to the latitude and longitude of the end point, into a variable len (step S104). That is, a direct distance between the start point and the end point is substituted into the variable len. In the following, the direct distance is called "direct distance len".

The function generation part 13 refers to the time/speed storage part 22, and generates interpolation point calculation function (step S105). Generation of the interpolation point calculation function corresponds to one example of estimating the speed between times stored in the time/speed storage part 22.

Figure 6:
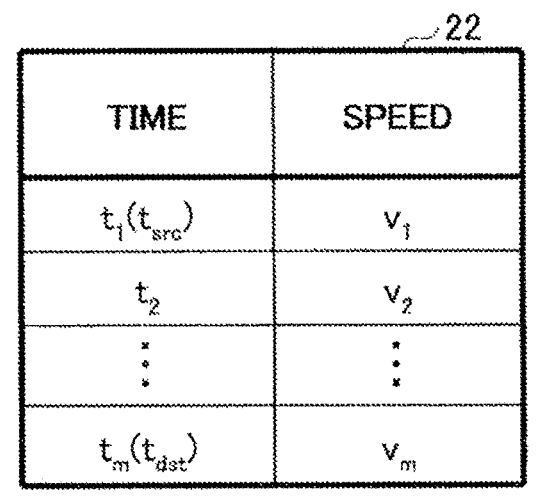

FIG. 6 is a diagram illustrating a configuration example of the time/speed storage part 22. As illustrated in FIG. 6, the time/speed storage part 22 stores the measured value of the speed of the vehicle at each time. The information, which the time/speed storage part 22 stores, may be acquired from a drive recorder or the like which is installed in the vehicle. The time/speed storage part 22 is provided for each vehicle ID. Accordingly, in step S105, the time/speed storage part 22 corresponding to the vehicle ID included in the input information is referred to. In a viewpoint of improving accuracy of the interpolation point, it is preferable to store records at intervals shorter than an interpolation interval into the time/speed storage part 22.

The interpolation point calculation function indicates a relationship between the time and the speed which the time/speed storage part 22 stores. The interpolation point calculation function is generated as illustrated in FIG. 7.

Figure 7:
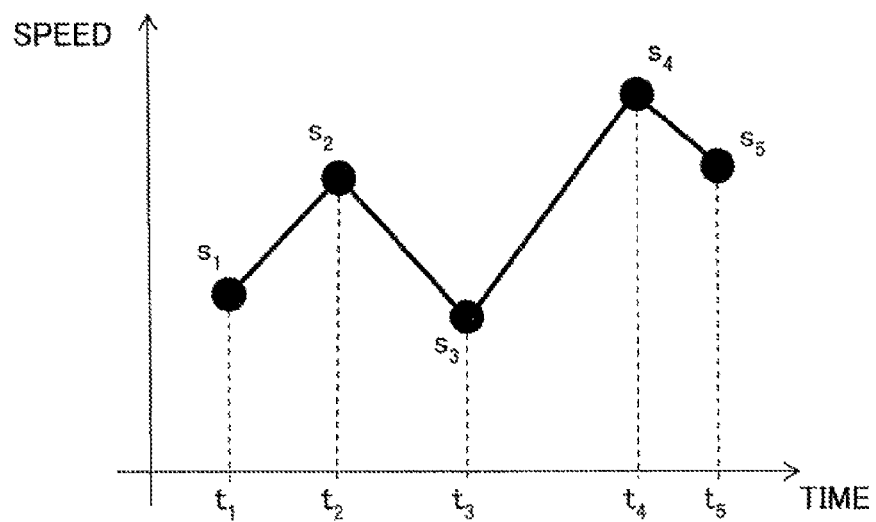
FIG. 7 is a diagram illustrating a generation example of an interpolation point calculation function.

FIG. 7 is a diagram illustrating a generation example of the interpolation point calculation function. In FIG. 7, with respect to a coordinate system in which an x-axis indicates the time and a y-axis indicates the speed, the interpolation point calculation function is generated by connecting points mapped from each of records stored in the time/speed storage part 22, with a line. All records stored in the time/speed storage part 22 may not be utilized to generate the interpolation point calculation function. Records related to a term including the interpolation interval may be utilized.

When an $i^{th}$ record of the time/speed storage part 22 is set as $s_i$, a set of polynominal expressions indicating lines connecting $s_i$ and $s_{i+1}$ may be regarded as the interpolation point calculation function. In the interpolation point calculation function, 1 ≤ i ≤ m−1 where $s_i$ indicates a record corresponding to the start point time, and $s_m$ indicates a record corresponding to the end point time. In the interpolation point calculation function, m indicates a minimum number of records included in the interpolation interval. In FIG. 7, a case of m=5 is illustrated.

When a record concerning time matching with the start point time is not stored in the time/speed storage part 22, time, which indicates prior to the start point time and the latest time stored in the time/speed storage part 22, may be set to be the start time. Also, if a record concerning time matching with the end point time is not stored in the time/speed storage part 22, time, which indicates later than the end point time and the earliest time stored in the time/speed storage part 22, may be set to be the end time.

After that, the candidate calculation part 14 calculates a total moving distance D of the vehicle from a start point time $t_{src}$ to an end point time $t_{dst}$ by integrating the interpolation point calculation function pertaining to an interval between the start point time $t_{src}$ and the end point time $t_{dst}$ (step S106). That is, when f(t) represents the interpolation point calculation function, the total moving distance D is calculated by the following formula:

$$D=\int_{t_{src}}^{t_{dst}} f(t)dt \quad \text{[Formula 1]}$$

Figure 8:
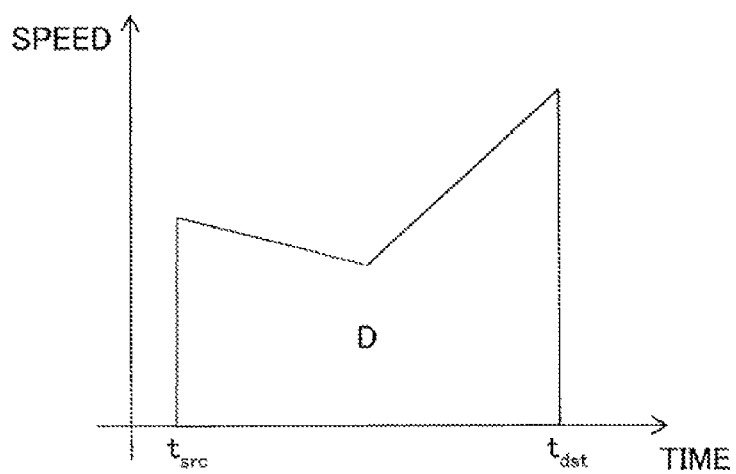
FIG. 8 is a diagram for explaining a calculation example of a moving distance from a start point time to an end point time based on the interpolation point calculation function.

As illustrated in FIG. 8, in the calculation in step S106, an area of the interval between the start point time $t_{src}$ and the end point time $t_{dst}$ is acquired in a region sandwiched between a polygonal line of the interpolation point calculation function and an x-axis.

FIG. 8 is a diagram for explaining a calculation example of the moving distance from the start point time to the end point time based on the interpolation point calculation function. In FIG. 8, compared with the generated interpolation points in FIG. 7, for the sake of convenience, the interpolation point calculation function is simplified.

After that, the candidate calculation part 14 determines that the total moving distance D is equal to or shorter than the direct distance len (step S107). This determination corresponds to determination whether or not a relationship between the total moving distance D and the direct distance len indicates a state as illustrated in FIG. 9.

Figure 9:
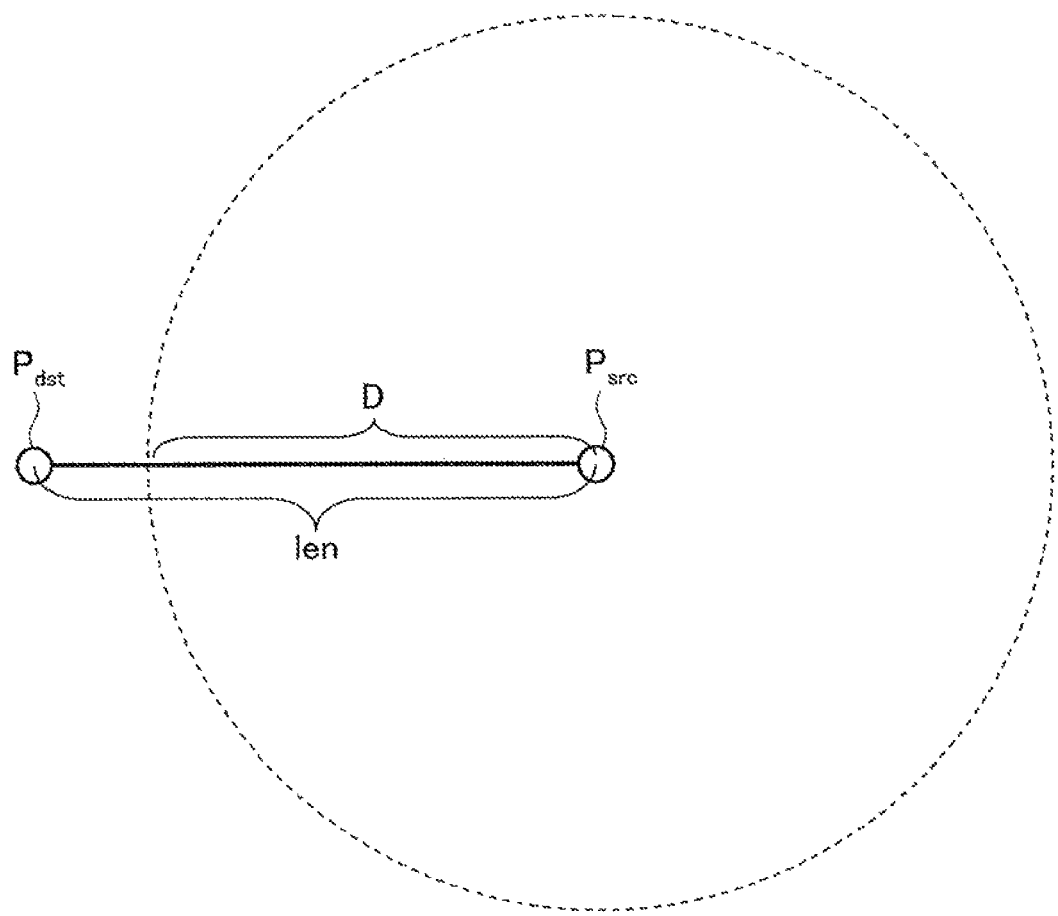
FIG. 9 is a diagram illustrating an example of a state in which a total moving distance from the start point time to the end point time is less than a direct distance.

FIG. 9 is a diagram illustrating one example of a state in which the total moving distance from the start point time to the end point time is shorter than the direct distance. FIG. 9 depicts the state in which the total moving distance D between the start point time $t_{src}$ and the end point time $t_{dst}$ is shorter than the direct distance len between the start point $P_{src}$ and the end point $P_{dst}$.

In this case (YES in step S107), since the interpolation point is not acquired by a method which will be described later, the process in FIG. 4A and FIG. 4B is terminated. Also, even in a case in which the direct distance len is the same as the total moving distance D (YES in step S107), since there is no meaning of acquiring the interpolation point by the method which will be described later, the process in FIG. 4A and FIG. 4B is terminated.

It makes even less sense theoretically that the state as illustrated in FIG. 9 occurs. The process in step S107 is regarded as a check process to assure that the state does not occur. When the total moving distance D is equal to or less than the direct distance len, the interpolation point calculation function is acquired by another method other than the method illustrated in FIG. 7. Then, steps following from the step S106 may be executed. A spline curved line passing each $s_i$ in FIG. 7 may be obtained as the interpolation point calculation function.

On the other hand, when the total moving distance D is greater than the direct distance len (NO in step S107), the candidate calculation part 14 calculates one divided interval $t_{range}$ in a case of equally dividing the interpolation interval depending on the number of the interpolation points desired to acquire in the interpolation interval (step S108). That is, the divided interval $t_{range}$ is calculated by the following expression:

$$t_{range} = (t_{dst} - t_{src})/(k+1)$$

A value of k indicates the number of the interpolation points desired to acquire in the interpolation interval. The value of k may be indicated with the input information or may be a fixed value. In the embodiment, the value of k indicates "3".

After that, the candidate calculation part 14 determines whether or not the value of the variable i is greater than k (step S109). That is, it is determined whether or not to conduct a process for acquiring k interpolation points. When the variable i is greater than k (YES in step S109), the process in FIG. 4A and FIG. 4B is terminated.

On the other hand, when the value of the variable i is equal to or less than k (NO in step S109), time $t_i$ where the interpolation point is added is calculated by the following expression (step S110).

$$t_i = t_{src} + t_{range} \times i$$

That is, for the start point time $t_{src}$, the time $t_i$ where the interpolation point is added indicates a time value resulted from adding values of i divided by intervals $t_{range}$. In the following, the time i where the interpolation point is added is called "interpolation time point $t_i$". The value of the variable i is equal to or greater than 1 and is equal to or less than k.

After that, the candidate calculation part 14 calculates the moving distance of the vehicle from the start point time $t_{src}$ to the interpolation time point $t_i$ by integrating the interpolation point calculation function in an interval from the start point time $t_{src}$ to the interpolation time point $t_i$ (step S111). In the following, the moving distance is called "first half moving distance $D_1$". The first half moving distance $D_1$ is calculated by the following formula 2.

$$D1 = \int_{tsrc}^{ti} f(t) dt \quad \text{[Formula 2]}$$

After that, the candidate calculation part 14 calculates the moving distance of the vehicle from the interpolation time point $t_i$ to the end point time $t_{dst}$ by integrating the interpolation point calculation function in an interval from the interpolation time point $t_i$ to the end point time $t_{dst}$ (step S112). In the following, the moving distance is called "last half moving distance $D_2$". The last half moving distance $D_2$ is calculated by the following formula 3.

$$D2 = \int_{ti}^{tdst} f(t) dt \quad \text{[Formula 3]}$$

Figure 10:
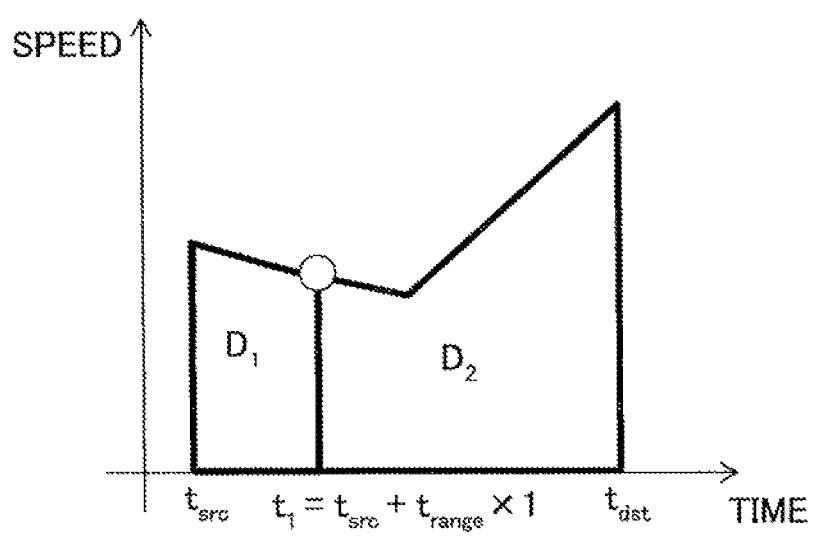
FIG. 10 is a diagram illustrating a calculation example for a first half moving distance and a last half moving distance pertaining to a first interpolation point.

When the value of the variable i indicates 1, processes of steps S110 through S112 are conducted as illustrated in FIG. 10.

FIG. 10 is a diagram illustrating a calculation example for the first half moving distance and the last half moving distance concerning a first interpolation time point.

In FIG. 10, in a region sandwiched between the polygonal line of the interpolation point calculation function and the x-axis, an area of the interval from the start point time $t_{src}$ to the interpolation time point $t_1$ is calculated as the first half moving distance D. Also, an area of the interval from the interpolation time point $t_1$ to the end point time $t_{dst}$ is calculated as the last half moving distance $D_2$.

After that, the candidate calculation part 14 substitutes a greater value in the first half moving distance $D_1$ and the last half moving distance $D_2$ into a variable $D_{upper}$ (step S113). After that, the candidate calculation part 14 substitutes a smaller value in the first half moving distance $D_1$ and the last half moving distance $D_2$ into a variable $D_{lower}$ (step S114). When the first half moving distance $D_1$ and the last half moving distance $D_2$ indicate the same value, either one of the moving distances $D_1$ and $D_2$ may be substituted into the variable $D_{upper}$, and another one may be substituted into the variable $D_{lower}$.

After that, the candidate calculation part 14 determines whether or not a value resulted from adding the direct distance len to a value of the variable $D_{lower}$ is greater than the variable $D_{upper}$ (step S115). This determination corresponds to determination whether or not a relationship between the value resulted from adding the direct distance len to a value of the variable $D_{lower}$ and the variable $D_{upper}$ indicates a state as illustrated in FIG. 11.

Figure 11:
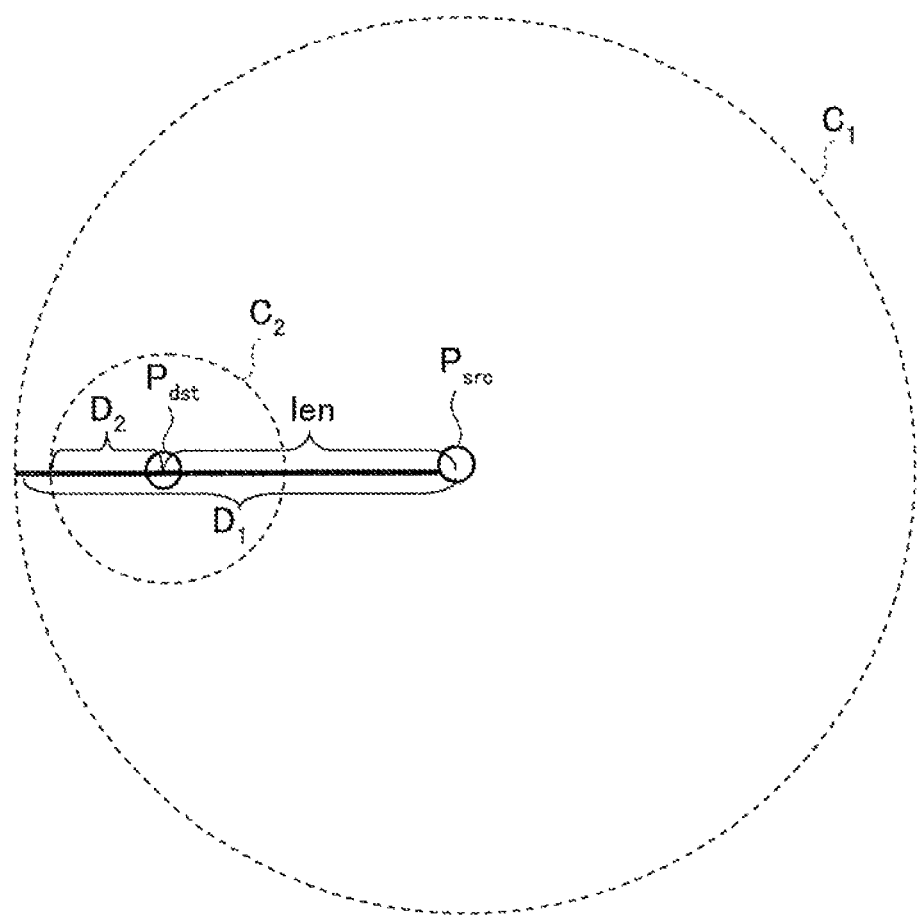
FIG. 11 is a diagram illustrating an example of a state in which either one of the first half moving distance and the last half moving distance is greater than a total of another moving distance and the direct distance.

FIG. 11 is a diagram illustrating an example in which either one of the first half moving distance $D_1$ and the last half moving distance $D_2$ is greater than a total of another moving distance and the direct distance.

In the state as illustrated in FIG. 11, there is no intersection point between a circle $C_1$ and a circle $C_2$. In the circle $C_1$, a center is the start point $P_{src}$ and a radius is the first half moving distance D. In the circle $C_2$, a center is the end point $P_{dst}$ and a radius is the last half moving distance $D_2$. As described later, in the embodiment, to acquire the interpolation point, intersection points are required for the circle $C_1$ and the circle $C_2$. Accordingly, it may not be possible to acquire the interpolation point. In this case (YES in step S115), the candidate calculation part 14 adds 1 to the variable i (step S121), and repeats steps after step S109. That is, the interpolation point is not added for a current interpolation time point $t_i$.

On the other hand, when a value resulted from adding the direct distance len to the value of the variable $P_{lower}$ is equal to or less than the value of the variable $D_{upper}$ (NO in step S115), the candidate calculation part 14 acquires the intersection points of the circle $C_1$ and the circle $C_2$ (step S116). In the circle $C_1$, the center is the start point $P_{src}$, and the radius is the first half moving distance D. In the circle $C_2$, the center is the end point $P_{dst}$ and the radius is the last half moving distance $D_2$.

Figure 12:
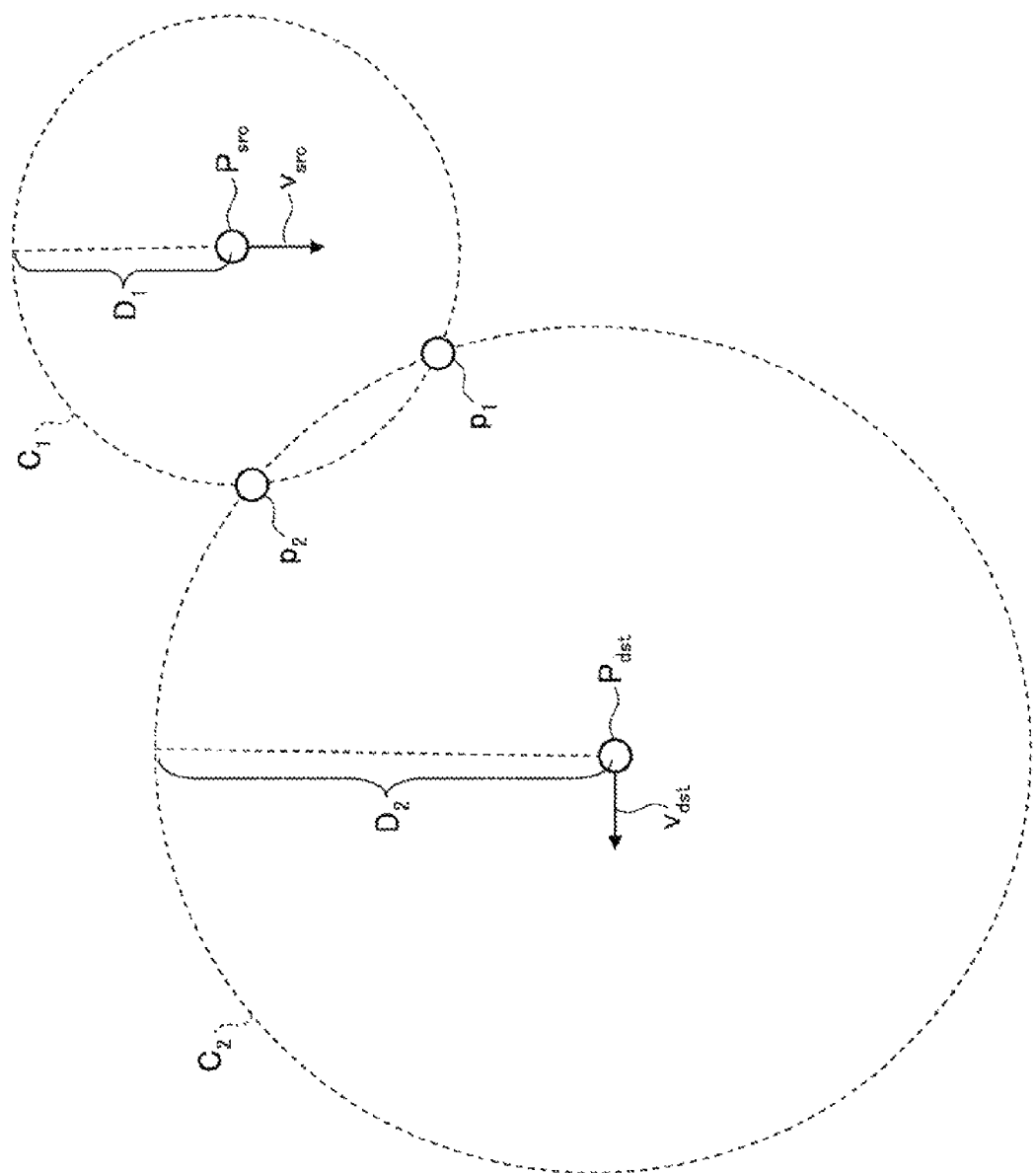
FIG. 12 is a diagram illustrating an example of intersection points of a circle in which a start point is set to be its center and a circle in which an end point is set to be its center, regarding a first interpolation time point.

FIG. 12 is a diagram illustrating an example of the intersection points the circle $C_1$ in which the center is the start point and the circle $C_2$ in which the center is the end point with respect to the first interpolation time point. In FIG. 12, with respect to the circle $C_1$ and the circle $C_2$, an example in which two intersection points $p_1$ and $p_2$ are acquired is illustrated. These intersection points correspond to points or locations which satisfy both the first half moving distance $D_1$ from the start point $P_{src}$ and the last half moving distance $D_2$ from the end point $P_{dst}$. Therefore, two intersection points $p_1$ and $p_2$ may be determined as candidates of the intersection points at the interpolation time point $t_i$. That is, points on a circumference of the circle $C_1$ indicate the moving distance $D_1$ of the vehicle from the start point $P_{src}$ between the start point time $t_{src}$ and the interpolation time point $t_i$. That is, the circumference of the circle $C_1$ is regarded as a set of points where the vehicle is located when the start point time $t_{src}$ is set as a reference. Similarly, points on the circumference of the circle $C_2$ indicate the moving distance $D_2$ of the vehicle from the start point $P_{dst}$ between the interpolation time point $t_i$ and the end point time $t_{dst}$. That is, the circumference of the circle $C_2$ is regarded as a set of points where the vehicle is located when the end point time $t_{src}$ is set as a reference. Accordingly, the intersection points of the circle $C_2$ and the circle $C_2$ are regarded as locations estimated where the vehicle is located at the interpolation time point $t_i$.

A vector $v_{src}$ indicates a vector (may be a unit vector) extending in the moving direction of the vehicle at the start point. A vector $v_{dst}$ indicates a vector (may be a unit vector) extending in the moving direction of the vehicle at the end point.

After that, the interpolation point determination part 15 branches a process depending on presence or absence of two intersection points of the circle $C_2$ and the circle $C_2$ (step S117). As illustrated in FIG. 12, if there are two intersection points (YES in step S117), the interpolation point determination part 15 executes a process for determining the interpolation point from two intersection points (step S118). That is, a method for determining either one of two intersection points, that is, one of the candidates for the interpolation point as the interpolation point.

FIG. 13A and FIG. 13B are diagrams illustrating examples of the method for determining one of two intersection points to be the interpolation point. In FIG. 13A and FIG. 13B, parts that are the same as those illustrated in FIG. 12 are given by the same reference numbers.

As illustrated in FIG. 13A, in a first determination method, the interpolation point is determined by comparing an angle formed by a vector $v_{s1}$ and $v_{src}$ with an angle formed by a vector $v_{s2}$ and $v_{src}$. In this case, an intersection point $p_1$ pertaining to the vector $v_{s1}$ being a smaller angle is determined as the interpolation point. The vector $v_{s1}$ is regarded as a vector which extends to the intersection point $Pp_1$ from the start point $P_{src}$ src where the start point $P_{src}$ is set as the start point of the moving path. The vector $v_{s2}$ is regarded as a vector which extends to the intersection point $p_2$ from the start point $P_{src}$ where the start point $P_{src}$ src is set as a start point of the moving path. The vector $v_{s1}$ and the vector $v_{s2}$ may be unit vectors.

The first determination method emphasizes the moving direction of the vehicle at the start point $P_{src}$ more than the moving direction of the vehicle at the end point $P_{dst}$.

The vector $v_{s1}$ and the vector $v_{s2}$ may be unit vectors, respectively.

As illustrated in FIG. 13B, in a second determination method, the interpolation point is determined by comparing an angle formed by a vector $v_{d1}$ and $v_{dst}$ with an angle formed by a vector $v_{d2}$ and $V_{dst}$. In this case, the intersection point $p_1$ pertaining to the vector $v_{d1}$ being a smaller angle is determined as the interpolation point. The vector $v_{d1}$ is regarded as a vector which extends to the end point $P_{dst}$ from the intersection point $p_1$ where the end point $P_{dst}$ is set as the start point of the moving path. The vector $v_{d2}$ is regarded as a vector which extends to the end point $P_{dst}$ from the intersection point $p_2$ where the end point $P_{dst}$ is set as the start point of the moving path.

The second determination method emphasizes the moving direction of the vehicle at the end point $P_{dst}$ more than the moving direction of the vehicle at the start point $P_{src}$.

In a third determination method, if the first half moving distance $D_1 \geq$ the last half moving distance $D_2$ is satisfied, the first determination method is applied. If the first half moving distance $D_1 <$ the last half moving distance $D_2$ is satisfied, the second determination method is applied. The third determination method emphasizes the moving direction which is closer to the moving distance. That is, the third determination method is based on a presumption in which the vehicle may move to a direction closer to the moving direction at the start point $P_{src}$ when the vehicle is closer to the start point $P_{src}$, and the vehicle may move to the direction closer to the moving direction at the end point $P_{dst}$ when the vehicle is closer to the end point $P_{dst}$.

Figure 14:
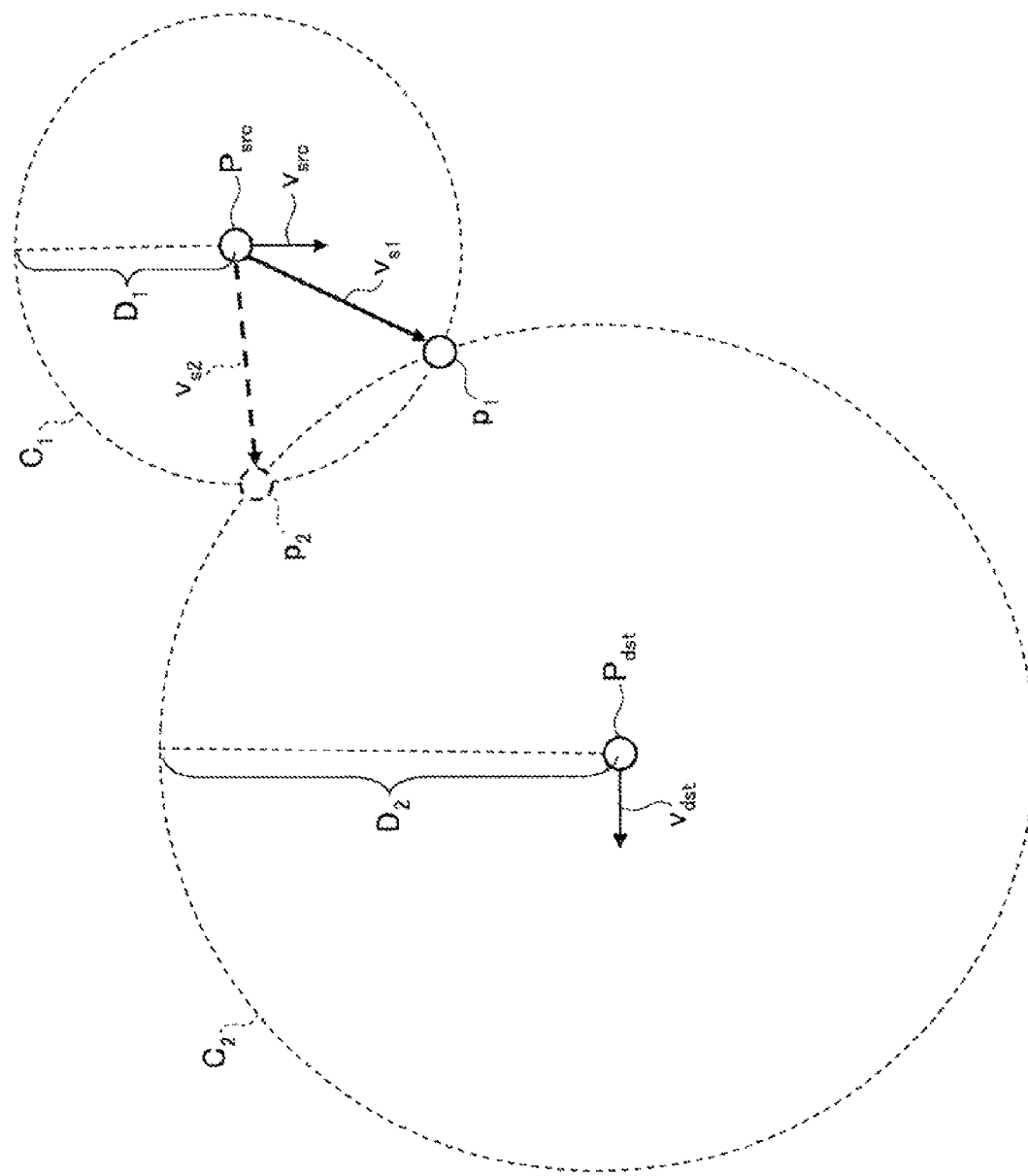
FIG. 14 is a diagram illustrating an example of the interpolation point at the first interpolation time point.

In a state illustrated in FIG. 12, when the first determination method is applied, the intersection point $p_1$ is determined as the interpolation point as illustrated in FIG. 14.

FIG. 14 is a diagram illustrating an example of the interpolation point at the first interpolation time point. In FIG. 14, an angle formed by the vector $v_{s1}$ and the vector $v_{src}$ is smaller than an angle formed by the vector $v_{s2}$ and the vector $v_{src}$. An example case, in which the intersection point $p_1$ pertaining to the vector $v_{s1}$ is determined as the interpolation point, will be described. That is, in FIG. 14, the vector and the intersection point, which are not selected as the interpolation point, are illustrated by dashed lines.

In the state illustrated in FIG. 12, even if either one of the first determination method through the third determination method, the interpolation point $p_1$ is determined as the interpolation point.

After that, the interpolation point determination part 15 stores information indicating the latitude and the longitude of the interpolation point in the interpolation point storage part 23 (step S120). A value of the interpolation time point i is also stored with the information indicating the latitude and the longitude of the interpolation point in the interpolation point storage part 23.

On the other hand, if there is one intersection point for the circle $C_1$ and the circle $C_2$, that is, if the circle $C_1$ and the circle $C_2$ are in close proximity to each other at a contact point (YES in step S119), the interpolation point determination part 15 stores the interception point to be the interpolation point in the interpolation point storage part 23 (step S120). After that the interpolation point determination part 15 repeats the steps after step S121.

After step S120, the interpolation point determination part 15 adds 1 to the variable i (step S121), and repeats steps after step S108.

If there is no interception point for the circle $C_1$ and the circle $C_2$ (NO in step S119), the interpolation point is not stored and the steps after step S121 are repeated.

Figure 15:
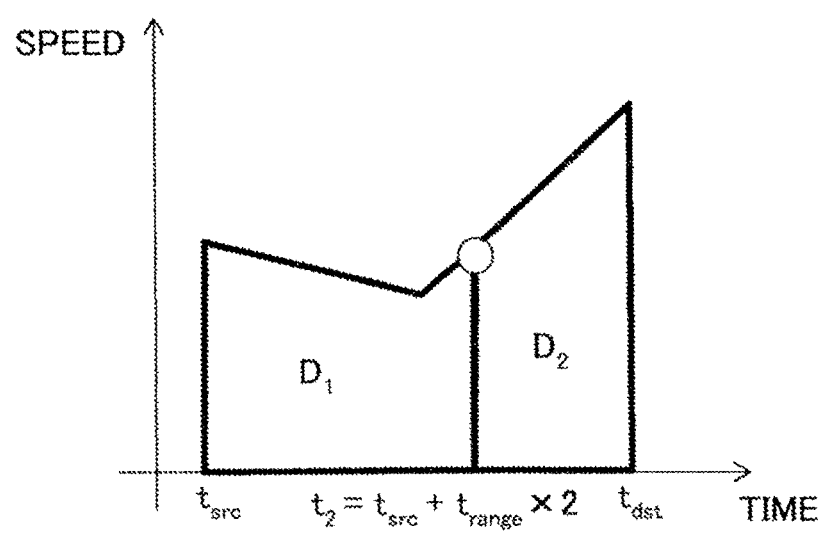
FIG. 15 is a diagram illustrating a calculation example for the first half moving distance and the last half moving distance, regarding a second interpolation time point.

After that, in a case in which the value of the variable i indicates two, when steps S110 to S114 are executed, the first half moving distance $D_1$ and the last first half moving distance $D_2$ at an interpolation time point $t_2$ may be calculated as illustrated in FIG. 15.

FIG. 15 is a diagram illustrating a calculation example of the first half moving distance $D_1$ and the last first half moving distance $D_2$ pertaining to a second interpolation time point $t_2$.

In FIG. 15, in the region sandwiched between the polygonal line of the interpolation point calculation function and the x-axis, an area of the interval from the start point time $t_{src}$ to the interpolation time point $t_2$ is calculated as the first half moving distance D. An area of the interval from the start point time $t_{dst}$ to the interpolation time point $t_2$ is calculated as the last half moving distance $D_2$.

Figure 16:
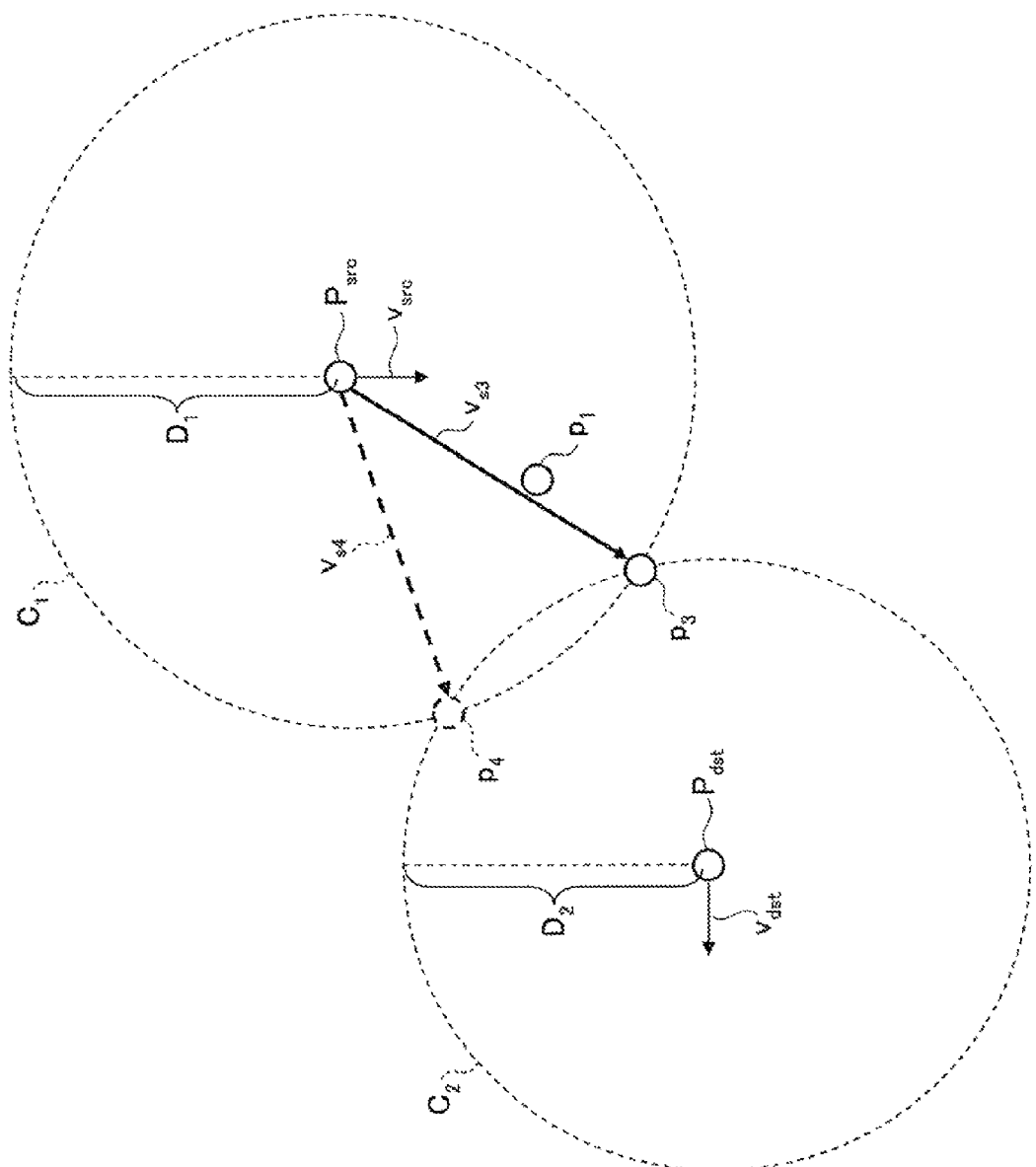
FIG. 16 is a diagram illustrating an example of the interpolation points at the second interpolation time point.

Based on the first half moving distance $D_1$ and the last half moving distance $D_2$ illustrated in FIG. 15, when steps S116 to S120 are executed, the interpolation point as illustrated in FIG. 16 is stored in the interpolation point storage part 23.

FIG. 16 is a diagram illustrating an example of the interpolation point at the second interpolation time point $t_2$. In FIG. 16, parts that are the same as those illustrated in FIG. 14 are given by the same reference numbers. However, values of the first half moving distance $D_1$ and the last half moving distance $D_2$ in FIG. 16 are different from those in FIG. 14.

In FIG. 16, two intersection points $p_3$ and $p_4$ exist for the circle $C_1$ and the circle $C_2$. In a case of applying the first determination method, an angle formed by a vector $v_{s3}$ and the vector $v_{src}$ is smaller than an angle formed by a vector $v_{s4}$ and the vector $v_{src}$. Accordingly, the interpolation point $p_3$ pertaining to the vector $v_{s3}$ is determined as the interpolation point, and is stored in the interpolation point storage part 23. The vector $v_{s3}$ extends in a direction from the start point $P_{src}$ to the interception point $p_3$, as the start point $P_{src}$ is set as the start point of the moving path. The vector $v_{s4}$ extends in a direction from the start point $P_{src}$ to the interception point $p_4$, as the start point $P_{src}$ is set as the start point of the moving path.

Figure 17:
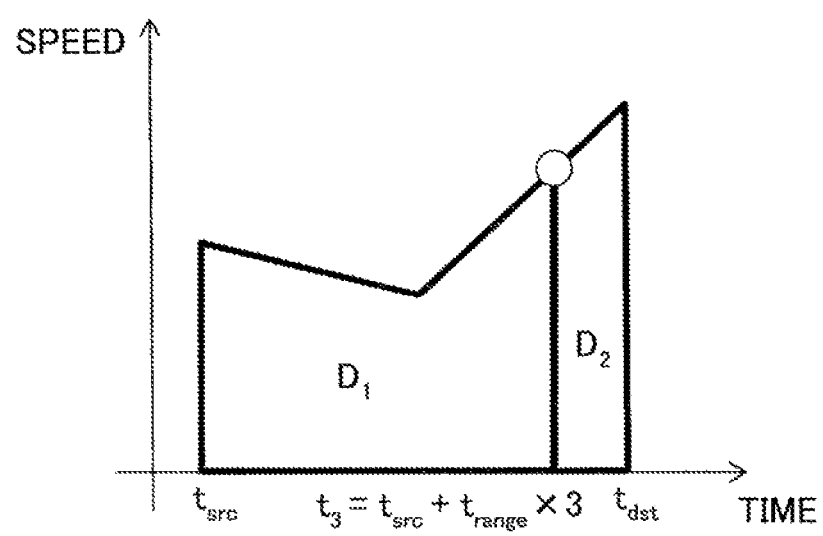
FIG. 17 is a diagram illustrating a calculation example for the first half moving distance and the last half moving distance, regarding a third interpolation time point.

After that, in a case in which the value of the variable i indicates three, when steps S110 to S114 are executed, the first half moving distance $D_1$ and the last half moving distance $D_2$ at the second interpolation time point $t_3$ may be calculated as illustrated in FIG. 17.

FIG. 17 is a diagram illustrating a calculation example of the first half moving distance $D_1$ and the last first half moving distance $D_2$ pertaining to a third interpolation time point $t_3$.

In FIG. 17, in the region sandwiched between the polygonal line of the interpolation point calculation function and the x-axis, an area of the interval from the start point time $t_{src}$ to the interpolation time point $t_3$ is calculated as the first half moving distance D. Also, an area of the interval from the interpolation time point $t_3$ to the end point time $t_{dst}$ is calculated as the last half moving distance $D_2$.

Figure 18:
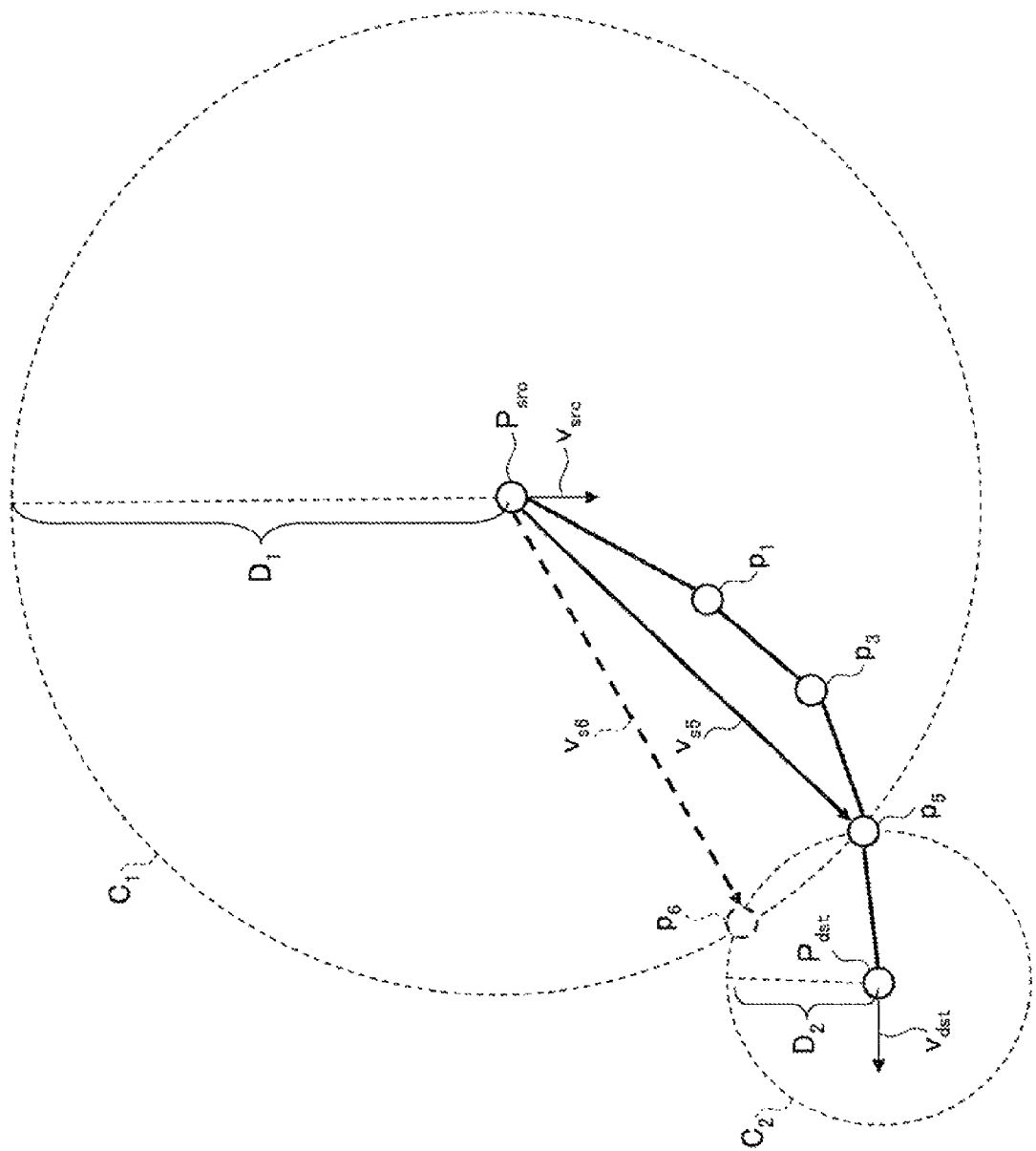
FIG. 18 is a diagram illustrating an example of the interpolation points at the third interpolation point.

When steps S116 to S120 are executed based on the first half moving distance $D_1$ and the last half moving distance $D_2$ illustrated in FIG. 17, the interpolation point as illustrated in FIG. 18 may be stored in the interpolation point storage part 23.

FIG. 18 is a diagram illustrating an example of the interpolation point at the third interpolation time point $t_3$. In FIG. 18, parts that are the same as those illustrated in FIG. 16 are given by the same reference numbers. Values of the first half moving distance $D_1$ and the last half moving distance $D_2$ are different from those in FIG. 16.

In FIG. 18, there are two intersection points $p_5$ and $p_6$ for the circle $C_1$ and the circle $C_2$. In a case in which the first determination method is applied, an angle formed by a vector $v_{s5}$ and the vector $v_{src}$ is smaller than an angle formed by a vector $v_{s6}$ and the vector $v_{src}$. Thus, the intersection point $p_5$ pertaining to the vector $v_{s5}$ is determined as the interpolation point, and is stored in the interpolation point storage part 23. The vector $v_{s5}$ extends in a direction from the start point $P_{src}$ to the start point $p_5$ in which the start point $P_{src}$ is set as the start point of the moving path. The vector $v_{s6}$ extends in a direction from the start point $P_{src}$ to the start point $p_6$ in which the start point $P_{src}$ is set as the start point of the moving path.

Three interpolation points (k=3) are acquired. That is, interpolation points $p_1$, $p_3$, and $p_5$ are obtained between the start point $P_{src}$ and the end point $P_{dst}$. As a result, as illustrated in FIG. 18, by connecting the start point $P_{src}$, interpolation points $p_1$, $p_3$, $p_5$, and the end point $P_{dst}$ with lines, it is possible to restore estimated values of the moving path from the start point $P_{src}$ to the end point $P_{dst}$.

Figure 19:
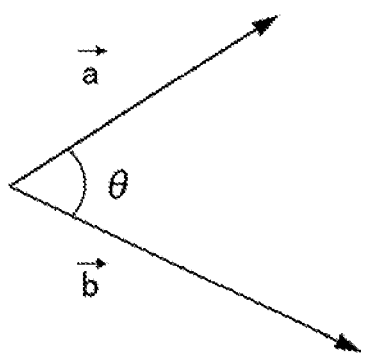
FIG. 19 is a diagram for explaining an angle formed by two vectors.

An angle formed by two vectors may be acquired as follows. FIG. 19 is a diagram for explaining the angle formed by the two vectors.

vector $a=(a_1, a_2)$, and vector $b=(b_1, b_2)$, where vector $a \neq 0$, and vector $b \neq 0$.

In this case, when an angle is represented by $\theta$ ($0 \; \theta \; 180$), the following formula 4 is satisfied.

$$\cos\theta = \frac{\vec{a} \cdot \vec{b}}{|\vec{a}||\vec{b}|} = \frac{a_1 b_1 + a_2 b_2}{\sqrt{a_1^2 + a_2^2}\sqrt{b_1^2 + b_2^2}} \quad \text{[Formula 4]}$$

Values with | | (absolute values) indicate sizes of the vectors a and b. The vector a may be developed based on the following formula 5.

$$|\vec{a}|^2 = \vec{a} \cdot \vec{a} = a_1^2 + a_2^2 \quad \text{[Formula 5]}$$

As described above, according to the embodiment, in addition to the location information of the movable body, it is possible to acquire the interpolation points by considering the speed depending on the time and the moving directions at the start point and the end point. Accordingly, compared with a case of acquiring the interpolation points based on the location information, it may be expected to acquire the interpolation points at higher accuracy.

In the embodiment, an example, in which the interpolation time points $t_i$ indicate a value acquired by equally dividing the interpolation interval, is described. Each of intervals among the interpolation time points $t_i$ may not be the same. Also, instead of giving the number of the interpolation points, the intervals among the interpolation time points $t_i$ may be given as the input information. If it is attempted to add the interpolation point at intervals of one minute, the interpolation time point $t_i$ is set at the intervals of one minute.

Also, an application range of the embodiment may not be limited to the moving path of the vehicle. The embodiment may be applied to the moving paths of other movable bodies such as an aircraft, a robot, a human, and the like. In a case of the human, a location, a moving speed, a moving direction, and the like depending on time concerning the human may be detected and recorded by a mobile body terminal possessed by the human.

In the embodiment, the input information storage part 21 is an example of a first storage part. The time/speed storage part 22 is an example of a second storage part. The candidate calculation part 14 is an example of a calculation part. The interpolation point determination part 15 is an example of a determination part.

According to the embodiment, it is possible to provide the trajectory interpolation apparatus, a trajectory interpolation method, and a computer-executable program and a non-transitory computer-readable recording medium thereof, which improve the accuracy of the interpolation points in the moving path.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A trajectory interpolation apparatus, comprising:
a first storage part configured to store a first time and first location information indicating a first location of a movable body at the first time, and to store a second time and second location information indicating a second location of the movable body at the second time;

a second storage part configured to store time and speed of the movable body at the time; and a calculation part configured to estimate the speed of the movable body between times which the second storage part stores, based on a relationship between the time and the speed which are stored in the second storage part, to specify a third time used to determine a point to interpolate for each of points based on information for specifying a count of the points which interpolate between the first location of the movable body at the first time and the second location of the movable body at the second time, and to calculate a first moving distance from the first time to the third time and a second moving distance from the third time used to acquire the first moving distance to the second time, based on estimated speed of the movable body; and a determination part configured to determine, as a point to interpolate, one of intersection points of a first circle and a second circle, the first circle in which a first location indicated by the first location information is set to be a first center, and the second circle in which a second location indicated by the second location information is set to be a second center.

2. The trajectory interpolation apparatus as claimed in claim 1, wherein the first storage part stores first information indicating a first moving direction of the movable body at the first location indicated by the first location information; and the determination part determines, as the point to interpolate, the intersection point pertaining to a direction having a smaller angle with respect to the moving direction, from a first direction toward one intersection point from the first location indicated by the first location information and a second direction toward another intersection point from the first location indicated by the first location information, when there are two intersection points.

3. The trajectory interpolation apparatus as claimed in claim 1, wherein the first storage part stores information indicating a moving direction of the movable body at the second location indicated by the second location information, and in a case in which there are two intersection points, the determination part determines, as the point to interpolate, the intersection point pertaining to a direction having a smaller angle with respect to the moving direction, from a first direction toward one intersection point from the second location indicated by the second location information and a second direction toward another intersection point from the second location indicated by the second location information.

4. The trajectory interpolation apparatus as claimed in claim 1, wherein the first storage part stores first information indicating a first moving direction of the movable body at a first location indicated by the first location information and second information indicating a second moving direction of the movable body at a second location indicated by the second location information; and in a case in which there are two intersection points, the determination part determines, as the point to interpolate, the intersection point pertaining to a direction having a smaller angle with respect to the moving direction, from a first direction toward one intersection point from the first location indicated by the first location information and a second direction toward another intersection point from the second location indicated by the second location information, and determines, as the point to interpolate, the intersection point pertaining to a direction having a smaller angle with respect to the moving direction, from a third direction toward one intersection point from the second location indicated by the second location information and a fourth direction toward another intersection point from the second location indicated by the second location information.

5. A trajectory interpolation method performed in a computer, the method comprising:

storing, by the computer, a first time and first location information indicating a first location of a movable body at the first time to a first storage part;

recording, by the computer, time and speed of the movable body at the time to a second storage part;

estimating, by the computer, the speed of the movable body between times which the second storage part stores based on a relationship between the time and the speed which are stored in the second storage part;

specifying, by the computer, a third time used to determine a point to interpolate for each of points based on information for specifying a count of the points which interpolate between the first location of the movable body at the first time and the second location of the movable body at the second time;

calculating, by the computer, a first moving distance from the first time to the third time and a second moving distance from the third time used to acquire the first moving distance to the second time, based on estimated speed of the movable body; and executing a determination process, by the computer, as a point to interpolate, one of intersection points of a first circle and a second circle, the first circle in which a first location indicated by the first location information is set to be a first center, and the second circle in which a second location indicated by the second location information is set to be a second center.

6. The trajectory interpolation method as claimed in claim 5, further comprising:

storing, by the computer, first information indicating a first moving direction of the movable body at the first location indicated by the first location information; and determining, by the computer, as the point to interpolate, the intersection point pertaining to a direction having a smaller angle with respect to the moving direction, from a first direction toward one intersection point from the first location indicated by the first location information and a second direction toward another intersection point from the first location indicated by the first location information, when there are two intersection points, in the determination process.

7. The trajectory interpolation method as claimed in claim 5, further comprising:

storing, by the computer, information indicating the moving direction of the movable body at the second location indicated by the second location information to the first storage part, wherein in the determination process, in a case in which there are two intersection points, the computer determines, as the point to interpolate, the intersection point pertaining to a direction having a smaller angle with respect to the moving direction, from a first direction toward one intersection point from the second location indicated by the second location information and a second direction toward another intersection point from the second location indicated by the second location information.

8. The trajectory interpolation method as claimed in claim 5, further comprising:
    storing, by the computer, first information indicating a first moving direction of the movable body at a first location indicated by the first location information and second information indicating a second moving direction of the movable body at a second location indicated by the second location information,
    wherein in the determination process, in a case in which there are two intersection points, the computer determines, as the point to interpolate, the intersection point pertaining to a direction having a smaller angle with respect to the moving direction, from a first direction toward one intersection point from the first location indicated by the first location information and a second direction toward another intersection point from the second location indicated by the second location information, and determines, as the point to interpolate, the intersection point pertaining to a direction having a smaller angle with respect to the moving direction, from a third direction toward one intersection point from the second location indicated by the second location information and a fourth direction toward another intersection point from the second location indicated by the second location information.

9. A non-transitory computer-readable recording medium recorded with a program which, when executed by a computer, causes the computer to perform a trajectory interpolation process comprising:
    storing a first time and first location information indicating a first location of a movable body at the first time to a first storage part;
    recording time and speed of the movable body at the time to a second storage part;
    estimating the speed of the movable body between times which the second storage part stores based on a relationship between the time and the speed which are stored in the second storage part;
    specifying a third time used to determine a point to interpolate for each of points based on information for specifying a count of the points which interpolate between the first location of the movable body at the first time and the second location of the movable body at the second time;
    calculating a first moving distance from the first time to the third time and a second moving distance from the third time used to acquire the first moving distance to the second time, based on estimated speed of the movable body; and
    executing a determination process, as a point to interpolate, one of intersection points of a first circle and a second circle, the first circle in which a first location indicated by the first location information is set to be a first center, and the second circle in which a second location indicated by the second location information is set to be a second center.

10. The non-transitory computer-readable recording medium as claimed in claim 9, further comprising:
    storing first information indicating a first moving direction of the movable body at the first location indicated by the first location information; and
    determining, as the point to interpolate, the intersection point pertaining to a direction having a smaller angle with respect to the moving direction, from a first direction toward one intersection point from the first location indicated by the first location information and a second direction toward another intersection point from the first location indicated by the first location information, when there are two intersection points, in the determination process.

11. The non-transitory computer-readable recording medium as claimed in claim 9,
    storing information indicating the moving direction of the movable body at the second location indicated by the second location information to the first storage part,
    wherein in a case in which there are two intersection points, the determination process determines, as the point to interpolate, the intersection point pertaining to a direction having a smaller angle with respect to the moving direction, from a first direction toward one intersection point from the second location indicated by the second location information and a second direction toward another intersection point from the second location indicated by the second location information.

12. The non-transitory computer-readable recording medium as claimed in claim 9,
    storing first information indicating a first moving direction of the movable body at a first location indicated by the first location information and second information indicating a second moving direction of the movable body at a second location indicated by the second location information,
    wherein in a case in which there are two intersection points, the determination process determines, as the point to interpolate, the intersection point pertaining to a direction having a smaller angle with respect to the moving direction, from a first direction toward one intersection point from the first location indicated by the first location information and a second direction toward another intersection point from the second location indicated by the second location information, and determines, as the point to interpolate, the intersection point pertaining to a direction having a smaller angle with respect to the moving direction, from a third direction toward one intersection point from the second location indicated by the second location information and a fourth direction toward another intersection point from the second location indicated by the second location information.

* * * * *